United States Patent [19]
Haake

[11] 3,832,047
[45] Aug. 27, 1974

[54] SEQUENTIAL PICTURE APPARATUS WITH OSCILLATORY OPTICAL COMPENSATOR

[75] Inventor: Robert Haake, Monrovia, Calif.

[73] Assignee: Bell & Howell Company, Chicago, Ill.

[22] Filed: July 7, 1972

[21] Appl. No.: 269,682

[52] U.S. Cl. .............................. 352/109, 352/204
[51] Int. Cl. .......................................... G03b 41/10
[58] Field of Search ............ 352/105, 106, 109, 204

[56] References Cited
UNITED STATES PATENTS

| 588,916 | 8/1897 | Steward et al. | 352/109 |
|---|---|---|---|
| 1,381,849 | 6/1921 | Sandell | 352/109 |
| 1,808,603 | 6/1931 | Huc | 352/109 |
| 2,255,892 | 9/1941 | Leventhal | 352/106 |
| 3,544,207 | 12/1970 | John | 352/109 |

FOREIGN PATENTS OR APPLICATIONS

| 12,366 | 5/1903 | Great Britain | 352/109 |
|---|---|---|---|
| 23,564 | 11/1901 | Great Britain | 352/109 |
| 444,731 | 3/1936 | Great Britain | 352/109 |
| 817,504 | 9/1937 | France | 352/109 |

Primary Examiner—Monroe H. Hayes
Attorney, Agent, or Firm—Benoit Law Corporation

[57] ABSTRACT

A sequential picture apparatus, such as a motion picture camera, projector, viewer or scanner, or a microfilm reader, employs a continuously moving film and an oscillatory optical compensator device for compensating the continuous film motion. The optical compensator is oscillated with the aid of a rotating circular array of actuating elements as well as a mechanism or device, such as an arm, for translating rotary motion of the actuating elements into oscillatory motion of the compensator device. The optical compensator is mounted for oscillatory motion at a location spaced by a predetermined distance from an axis about which the actuating elements are rotated. In accordance with one aspect of this invention, this predetermined distance is smaller than the radius of the circular array of actuating elements. According to another aspect of the invention, each actuating element has a projecting edge for engaging the compensator actuating device to the exclusion of other actuating element portions. Novel shutters and shutter mechanisms are also disclosed.

18 Claims, 6 Drawing Figures

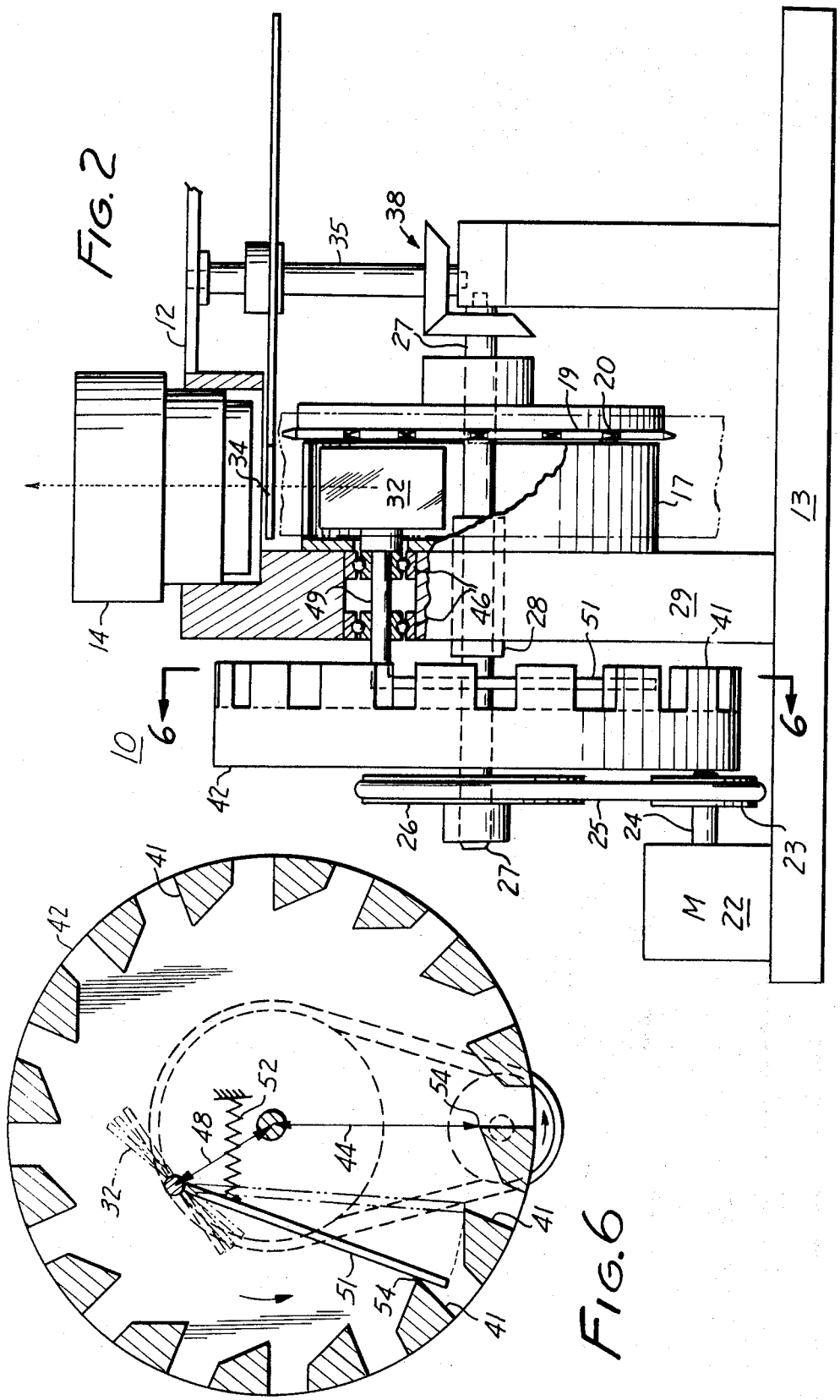

SEQUENTIAL PICTURE APPARATUS WITH OSCILLATORY OPTICAL COMPENSATOR

BACKGROUND OF THE INVENTION

1. Field of the Invention

The subject invention relates to sequential picture apparatus, such as motion picture cameras, projectors, viewers or scanners, or microfilm viewers and the like, and, more particularly, to sequential picture apparatus employing a continuously moving film and an oscillatory optical compensator device.

2. Description of the Prior Art

At least three quarters of a century ago, it has been proposed to employ a circular array of pins for actuating an arm to which an oscillatory mirror for compensating continuous film motion in a kinetoscope was attached, as may be seen from U.S. Pat. No. 588,916, by W. G. Steward and E. F. Frost, issued Aug. 24, 1897. This basic idea has in the meantime been pursued further, as may for instance be seen from U.S. Pat. No. 2,305,838, by Palle-Finn Beer, issued Dec. 22, 1942. Despite very intensive efforts in the motion picture art to make continuous film motion in cameras and projectors a reality, the prior art has been unable to produce a workable version of the basic idea under consideration.

One problem to which the prior art has been unable to present a practical solution has been the angular velocity error to which optical compensators have been subjected to in the type of system presently under consideration. Another problem has been the lack of tracking accuracy inherent in pin-type actuating elements, coupled with excessive noise and wear, as well as manufacturing difficulties.

Another drawback resides in the failure of the prior art to evolve more suitable shutter systems and mechanisms for operation with oscillatory continuous motion compensating devices.

SUMMARY OF THE INVENTION

It is an object of this invention to provide solutions to the above mentioned problems.

It is a more specific object of this invention to minimize tracking errors of oscillatory optical compensator devices in sequential picture apparatus with continuous film motion.

It is a further object of this invention to minimize noise and wear and improve manufacturability of oscillatory optical compensator actuating mechanisms having circular arrays of actuating elements.

It is a further object of this invention to provide improved shutters and shutter actuating mechanisms in conjunction with oscillatory optical compensator systems.

It is also an object of this invention to provide sequential picture apparatus embodying the improvements herein disclosed.

Other objects of the invention will become apparent in the further course of this disclosure.

From one aspect thereof, this invention resides in a sequential picture apparatus with continuous film motion and, more particularly, in the improvement comprising, in combination, an oscillatory optical compensator device for compensating the continuous film motion, a plurality of compensator actuating elements, rotary means for mounting the actuating elements in a circular array at a predetermined radius relative to an axis, means coupled to said rotary means for driving the actuating elements about said axis, means for mounting the compensator device for oscillatory motion at a location spaced by a predetermined distance from said axis, said predetermined distance being smaller than said radius, and means coupled to the compensator device and operatively associated with the actuating element for translating rotary motion of the actuating elements into oscillatory motion of the compensator device.

From another aspect thereof, this invention resides in a sequential picture apparatus with continuous film motion and, more specifically, in the improvement comprising, in combination, an oscillatory optical compensator device for compensating the continuous film motion, an arm coupled to the compensator device for oscillating the compensator device, means coupled to the compensator device for resetting the compensator device, a plurality of compensator actuating elements each having a projecting edge for engaging said arm to the exclusion of other actuating element portions, rotary means for mounting the actuating elements in a circular array, and means coupled to said rotary means for rotating the actuating elements.

From yet another aspect thereof, this invention resides in a sequential picture apparatus with continuous film motion, wherein a resettable oscillatory optical compensator device is actuated by way of an arm by a rotary circular array of actuating elements. The invention according to this aspect resides, more particularly, in the improvement comprising, in combination, an oscillatory shutter operatively associated with the compensator device, and means for driving the oscillatory shutter including a further arm coupled to the oscillatory shutter and having an end portion positioned for sequential engagement by the actuating elements in the mentioned circular array.

From another aspect thereof, the invention resides in a sequential picture apparatus with continuous film motion, and resides, more specifically in the improvement comprising, in combination, an oscillatory optical compensator device for compensating the continuous film motion, a plurality of compensator actuating elements, rotary means for mounting the actuating elements in a circular array at a predetermined radius relative to an axis, means coupled to said rotary means for driving the actuating elements about said axis, means for mounting the compensator device for oscillatory motion at a location spaced by a predetermined distance from said axis, said predetermined distance being smaller than said radius, means coupled to the compensator device and operatively associated with the actuating elements for translating rotary motion of the actuating elements into oscillatory motion of the compensator device, an oscillatory shutter operatively associated with the compensator device, and means for driving the oscillatory shutter, including means coupled to the oscillatory shutter and operatively associated with the actuating elements for translating rotary motion of the actuating elements into oscillatory motion of said shutter.

From yet another aspect thereof, the invention resides in a sequential picture apparatus with continuous film motion, and resides, more specifically, in the improvement comprising, in combination, an oscillatory optical compensator device for compensating the continuous film motion, an arm coupled to the compensator device for oscillating the compensator device, means coupled to the compensator device for resetting the compensator device, a plurality of compensator actuating elements each having a projecting edge for engaging said arm to the exclusion of other actuating element portions, rotary means for mounting the actuating elements in a circular array, means coupled to said rotary means for rotating the actuating elements, an oscillatory shutter operatively associated with the compensator device, and means for driving the oscillatory shutter, including a further arm coupled to the oscillatory shutter and having an end portion positioned to be engaged by said projecting edge of each actuating element to the exclusion of other actuating element portions.

The expression "sequential picture apparatus" is employed herein to cover not only motion picture apparatus, such as motion picture cameras, projectors, viewers or scanners, in which pictures in a sequence are typically interrelated, but also equipment, such as microfilm viewers and the like, in which pictures are recorded or viewed in sequence but are not necessarily interrelated with each other.

The phrase "continuous film motion" and language of similar import as herein employed is not necessarily intended to refer to the duration of the film movement, rather, this phrase and language are used in the sense of "non-intermittent film motion".

BRIEF DESCRIPTION OF THE DRAWINGS

The subject invention and its objects will become more readily apparent from the following detailed description of preferred embodiments thereof, illustrated by way of example in the accompanying drawings, in which like reference numerals designate like or functionally equivalent parts and in which:

FIG. 2 is a side view, partially in section, of the apparatus shown in FIG. 1;

FIG. 6 is a view taken on the line 6—6 in FIG. 2.

DESCRIPTION OF PREFERRED EMBODIMENTS

Figure 1:
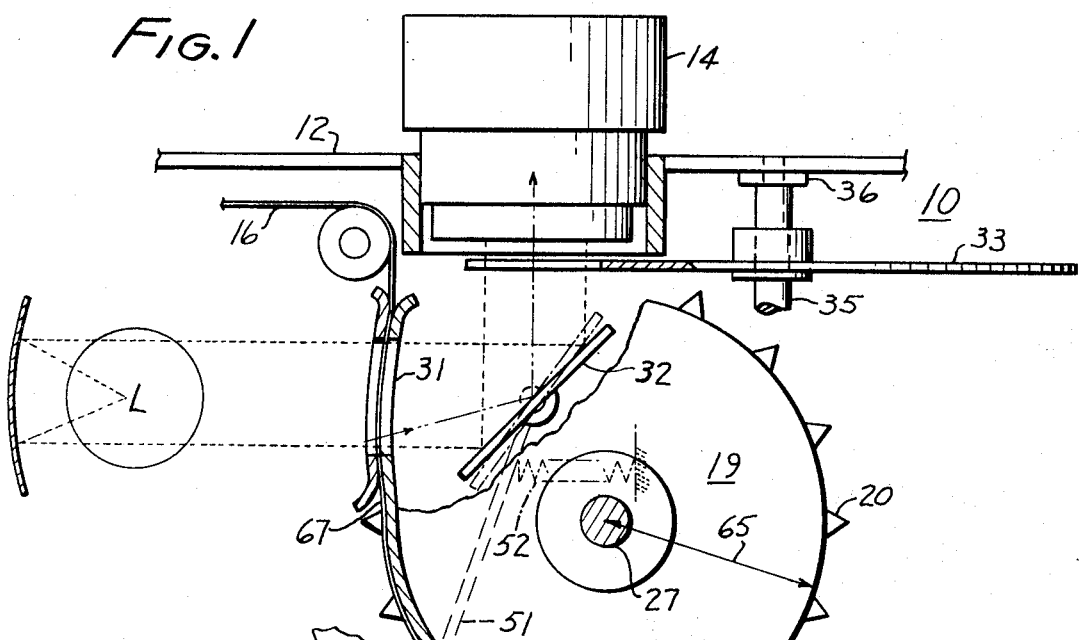
FIG. 1 is an elevation, partially in section, of a sequential picture apparatus, in the form of a motion picture camera, in accordance with a preferred embodiment of the subject invention.

The camera 10 has a housing 12 part of which is shown in FIG. 1, and a baseplate 13 within the housing. The housing is light tight in accordance with standard practice. The camera 10 also has a lens system or objective 14 through which scenes to be photographed on a film 16 are received.

The photographic film 16 which, for the purpose of increased clarity, has only been shown in FIG. 1, is guided in the camera by a stationary guide 17 and is advanced by a sprocket wheel 19 having sprockets 20 located thereon and uniformly distributed along the periphery thereof. In accordance with conventional practice, the sprockets 20 engage the film 16 at corresponding sprocket holes.

A conventional camera drive 22, such as an electric motor, is mounted on the baseplate 13 and has a pulley 23 attached to a shaft 24 thereof. A transmission belt 25 couples the motor pulley 23 to a further pulley 26. The pulley 26 sits on and is attached to a shaft 27 which is rotatable in a bearing 28. The bearing 28 is mounted in an upright wall or partition 29 which, in turn, is attached to the baseplate 13. The sprocket wheel 19 sits on and is attached to the shaft 27.

It will now be recognized that the motor 22 drives the sprocket wheel 19 through the pulley 23, belt 25, pulley 26 and shaft 27. The drive of the sprocket wheel 19 is continuous, that is non-intermittent. Accordingly, the drive of the film 16 through an image gate 31 is also continuous or non-intermittent.

In order to compensate the continuous film motion so that images projected on the film 16 will not be blurred, an optical compensator in the form of an oscillatory mirror 32 is provided in the path of the incoming images between the objective 14 and the gate 31. The motion compensating action of oscillating mirrors has been known for a long time in the motion picture art. In brief, the mirror 32 rotates or tilts in a first sense to move each incoming image with the continuously moving film 16 so as to keep each incoming image stationary relative to the moving film. Upon completion of the projection or photographing of an image, the mirror 32 is reset by rapid movement from an advanced position to an initial position preparatory to the projection or photographing of the next image.

A rotary shutter 33 having a number of shutter blades 34 is provided to obscure the optical path during resetting of the mirror 32. The shutter 33 has a shaft 35 which rotates in a bearing 36. The shaft 27 drives the shutter 33 by way of a gear 38, as indicated by a phantom line 39. The shutter 33 and its mounting and drive have been illustrated in a rather schematic fashion, as they are of a conventional nature. The gear 38 is preferably a rubber gear or a gear of another noise reducing material.

The compensator mirror 32 is actuated by a plurality of compensator actuating elements 41. As seen in FIGS. 2 and 6, rotary means in the form of a wheel 42 mount the actuating element 41 in a circular array at a predetermined radius 44 relative to an axis through the shaft 27. The wheel 42 is disposed on and attached to the shaft 27 so that the motor 22 is coupled to the wheel 42 by way of the pulley 23, belt 25, pulley 26, and shaft 27 for driving the actuating element 41 about an axis through the shaft 27.

Bearings 46 are located in an aperture through the wall or partition 29 for mounting the compensator device or mirror for oscillatory motion at a location spaced by a predetermined distance 48 from the above mentioned axis through the shaft 27. For this purpose, the mirror 32 is attached to a shaft 49 which extends through the bearings 46.

Means in the form of an arm 51 are coupled to the compensator device or mirror 32 and are operatively associated with the actuating elements 41 for translating rotary motion of the actuating elements into oscillatory motion of the compensator device or mirror 32. The arm has a first end attached to the mirror shaft 49 and has a second, free end portion positioned for sequential engagement by the actuating elements in the circular array on the actuator wheel 42.

As seen in FIGS. 1 and 6, the free end of the arm 51 initially engages each actuating element 41 and is then driven by the actuating element by a certain angular distance until the actuating element slips off the free end portion of the arm. This angular advancement of the arm 51 is transmitted by the shaft 49 to the mirror 32 which executes a corresponding angular advancement in order to maintain a given incoming image stationary on the continuously moving film 16.

The mirror 32 is biased in opposition to its angular advancement by a spring 52 which acts against the lever 51 to reset the mirror 32. Accordingly, the lever 51 is rapidly moved in a backward sense, and the mirror 32 is correspondingly reset from an advanced position to its initial position preparatory to the projection or photographing of the next image as soon as an actuating element 41 has slipped off the free end portion of the arm 51. The backwardly flying arm 51 impinges on and engages the next following actuating element 41. That element thereupon angularly advances the arm 51 and mirror 32 from an initial position to an advanced position until that actuating element, too, slips off the free end of the arm 51 for a further resetting of the mirror 32.

It will be noted at this juncture that the actuating elements 41 in accordance with a preferred embodiment of the subject invention are shaped differently from the pins employed in prior-art pin wheel compensator mirror drives. More specifically, the actuating elements 41 are more in the nature of cams rather than pins. In particular each actuating element 41 has an angularly and inwardly projecting edge 54 which engages the free end portion of the arm 51 to the exclusion of other actuating element portions. In other words, the edge 54 is the only portion which engages the arm 51.

Prototype work has confirmed that this feature renders the actuating mechanism of the subject invention substantially superior to prior-art pin wheel drives. First, a sharply defined edge 54 is substantially superior in terms of precision of actuation and actuation timing to the relatively large cylindrical outer surface of a pin. Due to the presence of the edges 54, the arm 51 leaves each actuating element 41 at an exactly defined instant.

Secondly, the actuating elements 41 according to the subject invention are much more easily formed, with much more precision, than prior-art pin-type actuating elements. Thus, the actuating elements 41 need not be set in the wheel 42 in the manner of actuating pins. Rather, the actuating elements 41 and wheel 42 may, for instance, be molded or cast by conventional techniques into a unitary assembly. The actuating elements 41 and actuating wheel 42 according to the subject invention thus lend themselves to relatively inexpensive high-precision mass production.

The embodiment of the subject invention just disclosed may be employed individually or in combination with the embodiment presently to be described.

This further embodiment of the subject invention is characterized by the essential requirement that the predetermined distance 48 between the axis of rotation of the shaft 27 and the axis of oscillation of the mirror 32 be smaller than the radius 44 between the axis of rotation of the shaft 27 and the edges 54 of the circularly arrayed actuating elements 41.

This provides very significant improvement over prior-art proposals in which the mentioned distance was larger than the pin circle radius as may, for instance, be seen from the above mentioned Steward and Frost U.S. Pat. No. 588,916, and prior-art proposals in which the mentioned distance and the mentioned radius were at best equal as may, for instance, be seen from the above mentioned Palle-Finn Beer U.S. Pat. No. 2,305,838.

Figure 5:
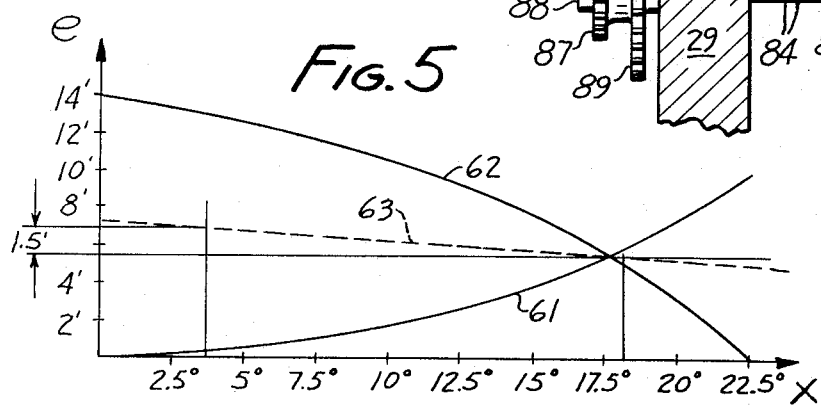
FIG. 5 is a graph illustrating the operation of the apparatus of FIGS. 1 and 2.

To better explain these facts, reference is made to FIG. 5 which is a plot of the tracking error $e$ versus angular travel $x$ of the actuating elements 41. The plot of FIG. 5 represents the tracking error situation that occurred in a prototype of the apparatus shown in FIGS. 1 and 2. That prototype had sixteen sprockets 20 and sixteen actuating elements 41, so that the angular travel for each actuating element 41 was 22.5° for each image frame.

In FIG. 5, the curve 61 represents the tracking error attributable to changes in the tangent angle between the lever 51 and a tangent on a circle of radius 44 through the edges 54 of the actuating elements 41. The curve 62, on the other hand, represents tracking error due to changes in the length of the effective lever arm between the axis of rotation of the mirror 32 and the point of contact of an edge 54 with the arm 51. As is easily seen from FIG. 5, the tracking errors due to the parameters represented by the curves 61 and 62 are to a large extent complementary leaving only the small tracking error represented by the dotted line 63. In the prototype under consideration, the maximum tracking error was only 1.5 angular minutes. In terms of tracking deviations on the film 16, this translates to a steadiness factor of about 5 microns. The angular velocity or tracking error due to the change in tangent angle would increase if the distance 48 were made equal to or larger than the radius 44 as in prior-art proposals. At the same time, the error due to the variation in effective lever arm would decrease, so that the latter error could no longer compensate the former error in the manner shown in FIG. 5. This would lead to intolerable tracking errors in the system.

In accordance with a further preferred embodiment of the subject invention, the distance 48 between the axis of rotation of the shaft 27 and the axis of oscillation of the mirror 32 is made smaller than the radius 65 of the sprocket wheel 19. As may be seen in FIG. 1, this places the image gate 31 close to the region 67 at which the film is engaged by the sprocket 20. This, in turn, minimizes the effect of film shrinkage or elongation between the image gate and the film drive sprockets. A problem which has always beset the development of continuous motion systems is thus solved in a convenient and effective manner.

It will also be recognized from FIG. 1 that the angle subtended by the arm 51 in the initial position, when an actuation element 41 first contacts the arm, and the arm in the extremely advanced position, when the particular actuating element is just about to slip off the free end of the arm, becomes progressively smaller as the length of the arm 51 is extended. Of course, the angle of oscillation of the mirror 32 is equal to this subtended angle. Moreover, the attainable angle of oscillation of the mirror 32 determines the angle within which the mirror can compensate the continuous motion of one image frame on the film 16. In brief, the mirror 32 can only compensate continuous motion of an image frame within an angle that is approximately twice the subtended angle between the initial position of the arm 51 and the extremely advanced position of this arm 51.

Since this subtended angle becomes smaller as the length of the arm 51 is increased, the angular compensating capability of the mirror 32 becomes smaller also. Stated more affirmatively, the dimensioning of the distance 48 according to the preferred embodiments of the subject invention substantially increases the angular compensation capability of the mirror 32.

A prototype projector of the apparatus of FIGS. 1 and 2 has been successfully tested at up to 80 frames per second without objectionable loss of image quality.

Figure 3:
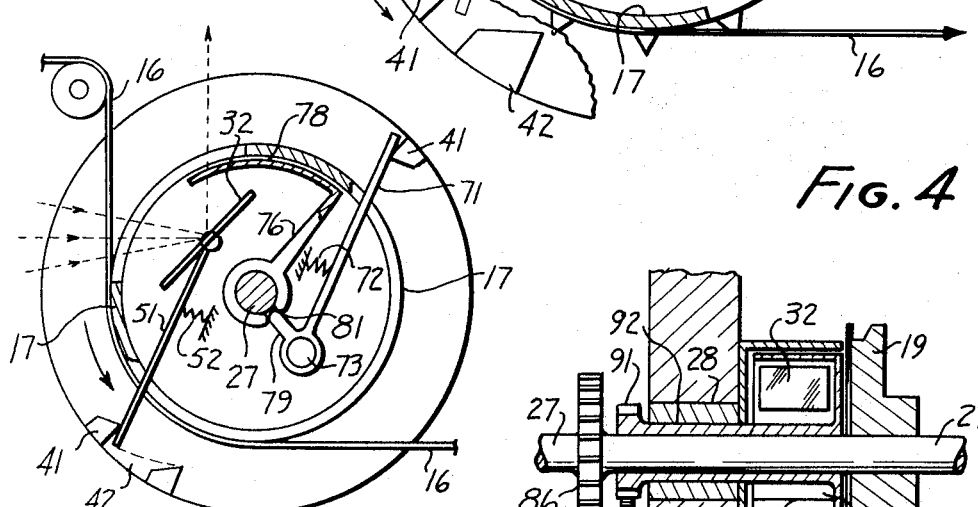
FIG. 3 is a side view of a modification of the apparatus of FIGS. 1 and 2, in accordance with a further preferred embodiment of the invention.

A further preferred embodiment of the subject invention for employing and driving an oscillatory shutter in combination with the mirror 32 is shown in FIG. 3.

According to FIG. 3, the actuating elements 41 on the rotating wheel 42 drive not only the arm 51, but also an arm 71 which is reset by a spring 72 and which is mounted on a shaft 73. The shaft 73 may be mounted by bearings (not shown) similar to the bearings 46 in the partition 29 shown in FIG. 2. Below the mirror 32 as seen in FIG. 2, the shaft 27 is provided with a sleeve 75. This sleeve 75 shown in FIG. 3 is similar to the sleeve 28 shown in FIG. 1 except that it is not attached to the partition 29 but rather is rotational on the shaft 27. An arm 76 is attached to the sleeve 75 and carries at its outer end an arcuate shutter blade 78 which is periodically insertable into the optical path between the objective 14 and mirror 32 so as to obscure incoming images during the resetting of the compensator mirror. An arm 79 is attached to the shaft 73 and projects into a slot 81 in the sleeve 75. The actuating elements 41 sequentially engage the arm 71 and angularly advance this arm in a counter-clockwise direction as seen in FIG. 3. This, in turn, advances the shaft 73 and the arm 79 in a counter-clockwise direction. Since an end of the arm 79 engages the rotary sleeve 75 at the slot 81, the sleeve 75 is rotated in a clockwise direction about the shaft 27. This, in turn, angularly advances the arm 76 and the shutter blade 78 in a clockwise direction out of the optical path between the objective 14 and the mirror 32. The sleeve 75 and arm 79 constitute means for stepping up the velocity of the oscillatory shutter 78 relative to the velocity of the further arm 71. In this manner, the shutter 78 can be moved out of and back into the optical path as rapidly as necessary. The remaining parts of the camera or other sequential picture apparatus may be the same as in FIGS. 1 and 2 and are thus not specifically illustrated in FIG. 3.

Figure 4:
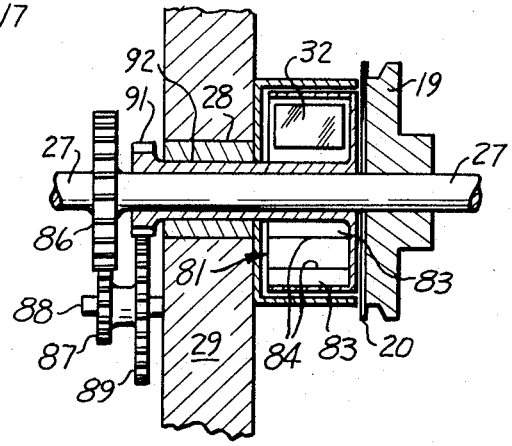
FIG. 4 is a diagrammatic illustration of a further modification of the apparatus of FIGS. 1 and 2, in accordance with another preferred embodiment of the invention.

According to FIG. 4, a barrel shutter 81 is operatively associated with the mirror 32. The barrel shutter 81 is concentrically located inside the film guide 17 and encompasses the compensator mirror 32.

Barrel shutters as such are known. They comprise a plurality of curved shutter blades 83 alternating with a plurality of apertures 84. The shutter 81 is driven from the rotating shaft 27 by gearing including a gear wheel 86 attached to the shaft 27, a pinion 87 meshing with the gear wheel 86 and rotatable on an auxiliary shaft 88, a gear wheel 89 connected to the pinion 87 and rotatable on the shaft 88, and a pinion 91 meshing with the gear wheel 89. The pinion 91 sits on and is connected to a sleeve 82 which is located between and which is rotatable relative to the shaft 27 and the bearing sleeve 28 in the partition or mounting plate 29 (see FIGS. 2 and 4).

The barrel shutter 81 is mounted on and driven by the rotary sleeve 92 so as to periodically obscure the optical path between the objective 14 and the mirror 32 during resetting of this mirror.

The film is continuously advanced by the sprockets 20 on the sprocket wheel 19 as before. Also, the compensator mirror 32 in FIG. 4 is advanced in the same manner as the mirror 32 in FIGS. 1 and 2, so that the parts and components for advancing the mirror have not again been illustrated in FIG. 4.

Other rotary and other oscillatory shutter systems may be developed on the basis of the subject disclosure. Further modifications and variations within the spirit and scope of the subject invention will become apparent from or suggest themselves by the subject disclosure to those skilled in the art.

I claim:

1. In a sequential picture apparatus with continuous film motion, the improvement comprising in combination:
   an oscillatory optical compensator device for compensating the continuous film motion;
   a plurality of compensator actuating elements;
   rotary means for mounting the actuating elements in a circular array at a predetermined radius relative to an axis;
   means coupled to said rotary means for driving the actuating elements about said axis;
   means for mounting the compensator device for oscillatory motion at a location spaced by a predetermined distance from said axis, said predetermined distance being smaller than said radius; and
   means coupled to the compensator device and operatively associated with the actuating elements for translating rotary motion of the actuating elements into oscillatory motion of the compensator device.

2. An apparatus as claimed in claim 1, wherein:
   said motion translating means include an arm connected to the compensator device and having an end portion positioned for sequential engagement by the actuating elements in said circular array.

3. An apparatus as claimed in claim 2, wherein:
   said motion translating means include means for resetting the compensator device.

4. An apparatus as claimed in claim 1, wherein:
   said motion translating means include an arm connected to the compensator device and having an end portion positioned for sequential engagement by the actuating elements in said circular array; and
   each of said actuating elements has an inwardly projecting edge for engaging said arm end portion to the exclusion of other actuating element portions.

5. An apparatus as claimed in claim 1, including:
   a rotary shutter operatively associated with the compensator device; and
   means for driving the rotary shutter.

6. An apparatus as claimed in claim 5, wherein:
   said rotary shutter is a barrel shutter encompassing the compensator device.

7. An apparatus as claimed in claim 1, including:
   an oscillatory shutter operatively associated with the compensator device; and means for driving the oscillatory shutter.

8. In a sequential picture apparatus with continuous film motion, the improvement comprising in combination:
an oscillatory optical compensator device for compensating the continuous film motion;
a plurality of compensator actuating elements;
rotary means for mounting the actuating elements in a circular array at a predetermined radius relative to an axis;
means coupled to said rotary means for driving the actuating elements about said axis;
means for mounting the compensator device for oscillatory motion at a location spaced by a predetermined distance from said axis, said predetermined distance being smaller than said radius;
means coupled to the compensator device and operatively associated with the actuating elements for translating rotary motion of the actuating elements into oscillatory motion of the compensator device;

an oscillatory shutter operatively associated with the compensator device; and
means for driving the oscillatory shutter, including means coupled to the oscillatory shutter and operatively associated with the actuating elements for translating rotary motion of the actuating elements into oscillatory motion of said shutter.

9. An apparatus as claimed in claim 8, wherein:
said means coupled to the oscillatory shutter include an arm having an end portion positioned for sequential engagement by the actuating elements in said circular array.

10. An apparatus as claimed in claim 8, wherein:
said motion translating means coupled to the compensator device include a first arm connected to the compensator device and having an end portion positioned for sequential engagement by the actuating elements in said circular array;
said means coupled to the oscillatory shutter include a second arm having an end portion positioned for sequential engagement by the actuating elements in said circular array; and
each of said actuating elements has an inwardly projecting edge for engaging said end portions of the first and second arms to the exclusion of other actuating element portions.

11. An apparatus as claimed in claim 1, wherein:
said apparatus includes a sprocket wheel having a predetermined radius for continuously advancing film; and
said predetermined distance is smaller than said sprocket wheel radius.

12. In a sequential picture apparatus with continuous film motion, the improvement comprising in combination:
an oscillatory optical compensator device for compensating the continuous film motion;
an arm coupled to the compensator device for oscillating the compensator device;
means coupled to the compensator device for resetting the compensator device;
a plurality of compensator actuating elements each having an angularly projecting edge for engaging said arm to the exclusion of other actuating element portions;
rotary means for mounting the actuating elements in a circular array; and
means coupled to said rotary means for rotating the actuating elements.

13. An apparatus as claimed in claim 12, including:
a rotary shutter operatively associated with the compensator device; and
means for driving the rotary shutter.

14. An apparatus as claimed in claim 13, wherein:
said rotary shutter is a barrel shutter encompassing the compensator device.

15. An apparatus as claimed in claim 12, including:

an oscillatory shutter operatively associated with the compensator device; and
means for driving the oscillatory shutter.

16. In a sequential picture apparatus with continuous film motion, the improvement comprising in combination:
an oscillatory optical compensator device for compensating the continuous film motion;
an arm coupled to the compensator device for oscillating the compensator device;
means coupled to the compensator device for resetting the compensator device;
a plurality of compensator actuating elements each having a projecting edge for engaging said arm to the exclusion of other actuating element portions;

rotary means for mounting the actuating elements in a circular array;
means coupled to said rotary means for rotating the actuating elements;
an oscillatory shutter operatively associated with the compensator device; and
means for driving the oscillatory shutter, including a further arm coupled to the oscillatory shutter and having an end portion positioned to be engaged by said projecting edge of each actuating element to the exclusion of other actuating element portions.

17. In a sequential picture apparatus with continuous film motion, wherein a resettable oscillatory optical compensator device is actuated by way of an arm by a rotary circular array of actuating elements, the improvement comprising in combination:
an oscillatory shutter operatively associated with the compensator device; and
means for driving the oscillatory shutter including a further arm coupled to the oscillatory shutter and having an end portion positioned for sequential engagement by the actuating elements in said circular array.

18. An apparatus as claimed in claim 17, wherein:
said shutter driving means include means for stepping up the velocity of the oscillatory shutter relative to the velocity of said further arm.

* * * * *